US007567488B2

(12) United States Patent
Abe et al.

(10) Patent No.: US 7,567,488 B2
(45) Date of Patent: Jul. 28, 2009

(54) DROPOUT DETECTION CIRCUIT AND OPTICAL DISC APPARATUS

(75) Inventors: Masayoshi Abe, Osaka (JP); Teruhiko Izumi, Shiga (JP); Katsumi Morita, Kyoto (JP)

(73) Assignee: Panasonic Corporation, Osaka (JP)

( * ) Notice: Subject to any disclaimer, the term of this patent is extended or adjusted under 35 U.S.C. 154(b) by 559 days.

(21) Appl. No.: 11/349,884

(22) Filed: Feb. 9, 2006

(65) Prior Publication Data

US 2006/0126473 A1 Jun. 15, 2006

Related U.S. Application Data

(62) Division of application No. 10/247,328, filed on Sep. 20, 2002, now Pat. No. 7,023,782.

(30) Foreign Application Priority Data

Oct. 24, 2001 (JP) .............................. 2001-326419

(51) Int. Cl.
*G11B 15/52* (2006.01)
(52) U.S. Cl. .................. 369/47.18; 369/53.32
(58) Field of Classification Search .............. None
See application file for complete search history.

(56) References Cited

U.S. PATENT DOCUMENTS

| 4,587,644 | A | 5/1986 | Fujiie |
| 4,835,758 | A | 5/1989 | Fujishima |
| 5,402,277 | A | 3/1995 | Nagasawa et al. |
| 5,491,677 | A * | 2/1996 | Sasaki .................. 369/44.36 |
| 5,517,477 | A * | 5/1996 | Sako ..................... 369/53.18 |
| 6,172,953 | B1 * | 1/2001 | Kamiyama ............. 369/53.15 |
| 6,185,361 | B1 | 2/2001 | Ise |
| 6,798,725 | B1 | 9/2004 | Horibe et al. |
| 2002/0001265 | A1 | 1/2002 | Tateishi et al. |

FOREIGN PATENT DOCUMENTS

| JP | 04-369986 | 12/1992 |
| JP | 06-180971 | 6/1994 |
| JP | 06-223373 | 8/1994 |
| JP | 08-180409 | 7/1996 |
| JP | 11-096655 | 4/1999 |
| JP | 11-149636 | 6/1999 |

* cited by examiner

*Primary Examiner*—Paul Huber
(74) *Attorney, Agent, or Firm*—McDermott Will & Emery LLP

(57) ABSTRACT

The dropout detection circuit of the invention includes: a high-speed envelope detection circuit for detecting an envelope of a reflection signal of a light beam with a first time constant; a low-speed envelope detection circuit for detecting an envelope of the reflection signal with a second time constant larger than the first time constant; a differential circuit for generating a difference signal indicating the difference between the envelopes detected by the envelope detection circuits; and a comparator for converting the difference signal to a binary value according to a predetermined binary criterion. The high-speed envelope detection circuit makes the first time constant larger during recording than during reproduction, to enable stable dropout detection irrespective of during reproduction or during recording.

7 Claims, 11 Drawing Sheets

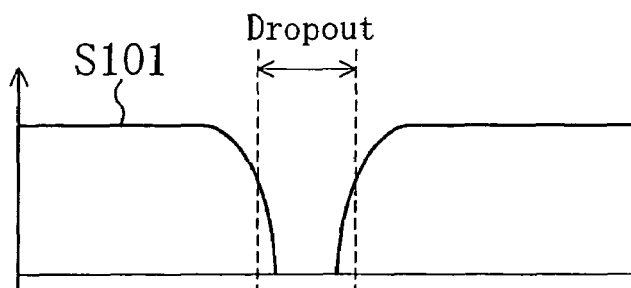
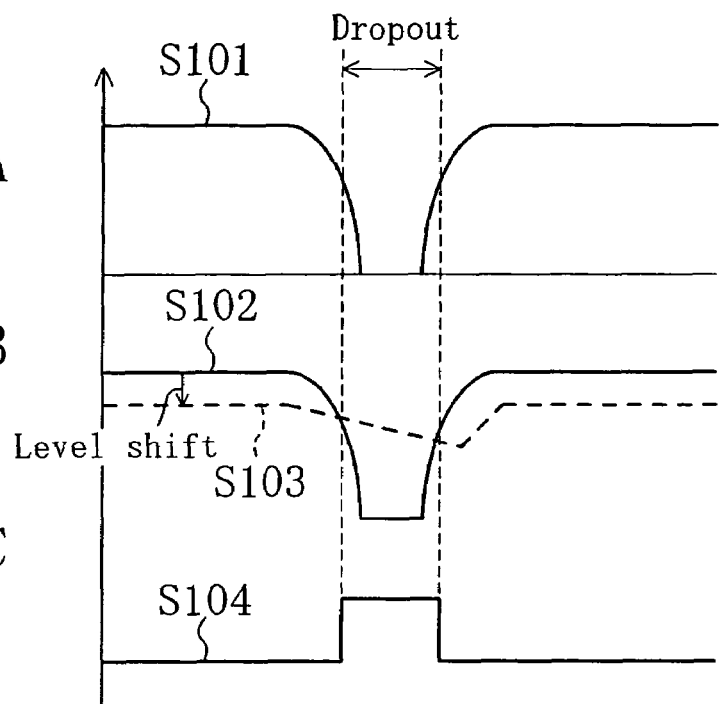
FIG. 11A
FIG. 11B
FIG. 11C

DROPOUT DETECTION CIRCUIT AND OPTICAL DISC APPARATUS

This application is a divisional of U.S. application Ser. No. 10/247,328, filed Sep. 20, 2002, now U.S. Pat. No. 7,023,782.

BACKGROUND OF THE INVENTION

The present invention relates to a dropout detection circuit and an optical disc apparatus incorporating the dropout detection circuit.

An optical disc apparatus reproduces a signal recorded on an optical disc by converging a light beam emitted from a light source such as a semiconductor laser on the optical disc rotating at a predetermined rotational speed to irradiate the optical disc. Such an optical disc apparatus is provided with a dropout detection circuit to deal with an event of failure of good signal reproduction due to generation of a blemish and the like on an optical disc, that is, an event of occurrence of a dropout. Various methods have been proposed for dropout detection. Basically, however, the dropout detection includes detecting a change in the envelope of a reproduced RF signal.

<Dropout Detection>

FIG. 10 is a block diagram of a conventional dropout detection circuit, and FIGS. 11A to 11C are illustrations of the operation of the conventional dropout detection circuit.

A RF signal S100 reproduced from an optical disc is first input into an AGC circuit 145, which is provided generally for stabilizing the amplitude level of the input signal against possible overall and local inconsistencies in the reflection from the disc surface. Without the AGC circuit 145, an inconsistency in the reflection from an optical disc will be detected as an envelope change. Therefore, by inputting the RF signal S100 into the AGC circuit 145, a signal S101 output from the AGC circuit 145 has a waveform stabilized in amplitude level as shown in FIG. 11A.

There are provided two envelope detection circuits having different time constants, high-speed envelope detection circuit 147 having a smaller time constant and a low-speed envelope detection circuit 146 having a time constant larger than that of the high-speed envelope detection circuit 147. For example, when the RF signal S100 of which the envelope sharply changes due to a dropout is input into the envelope detection circuits as shown in FIG. 11A, the high-speed envelope detection circuit 147 having a small time constant outputs a signal S102 having a waveform following the sharp change in the envelope of the RF signal S100 as shown in FIG. 11B. On the contrary, the low-speed envelope detection circuit 146 having a large time constant, which fails to follow the sharp change in the envelope of the RF signal S100, outputs a signal having a waveform changing with a fixed time constant.

The signal output from the low-speed envelope detection circuit 146 having a large time constant is input into a level shift circuit 148, where the signal is changed to a signal S103 provided with a desired voltage difference as shown in FIG. 11B. The signal S103 and the signal S102 output from the high-speed envelope detection circuit 147 having a small time constant are input into a comparator 149. The comparator 149 compares the input signals S102 and S103 with each other, to detect the sharp fall in the envelope of the RF signal S100, that is, the dropout. After comparison, the comparator 149 outputs a dropout detection signal S104 as shown in FIG. 11C.

The dropout detection signal S104 output from the comparator 149 is input into a phase compensation circuit for focusing control and a phase compensation circuit for tracking control. These phase compensation circuits normally perform phase compensation of a signal from an A/D converter at a preceding stage and transmit phase-compensated signals to a next stage as control error signals. When the dropout detection signal S104 is in the "H" level, the phase compensation circuits continue holding the control error signals obtained before the change of the level of the dropout detection signal S104 from "L" to "H". In this way, a false control error signal generated during a dropout is prevented from being transmitted to the next stage, and thus deviation in focusing control and tracking control due to a false control error signal is prevented.

As described above, dropout detection is performed by detecting a change in the envelope of the reproduced RF signal. This indicates that at least information must be pre-recorded on a medium from which reproduction is made. For example, information is previously recorded on reproduction-only media such as CD, CD-ROM and DVD-ROM in the form of pits. Therefore, detection of a dropout is possible during reproduction. On the contrary, recording media such as CD-R, CD-RW, DVD-R, DVD-RW and DVD-RAM include no information in the initial state, and therefore detection of a dropout during recording is not possible. To overcome this problem, in the case of DVD-RAM, recording is temporarily stopped if the recording starts to go off track, and measures such as storing data in another management region are taken. This is however not applicable to media requiring continuous recording such as DVD-R.

With recent commercialization of various types of recording/reproduction apparatuses, requests for dropout detection not only during reproduction but also during recording have increased. However, in the current level of dropout detection, continuous dropout detection at the switching of the state from reproduction to recording or from recording to reproduction is not possible.

SUMMARY OF THE INVENTION

An object of the present invention is providing a dropout detection circuit capable of detecting a dropout invariably stably irrespective of during reproduction or during recording.

The dropout detection circuit of the present invention includes: first envelope detection means for detecting an envelope of a reflection signal of a light beam converged on an optical disc for irradiation of the optical disc with a first time constant; second envelope detection means for detecting an envelope of the reflection signal with a second time constant larger than the first time constant; differential means for generating a difference signal indicating a difference between the envelope detected by the first envelope detection means and the envelope detected by the second envelope detection means; and comparator means for converting the difference signal generated by the differential means to a binary value according to a predetermined binary criterion, wherein the first envelope detection means sets the first time constant to be larger during recording than during reproduction.

According to the invention described above, the first time constant is larger during recording than during reproduction. This prevents detection of a false dropout and enables stable dropout detection irrespective of during reproduction or during recording.

In the dropout detection circuit of the invention described above, the first envelope detection means and the second envelope detection means preferably set the first time constant and the second time constant to be identical to each other at the time of switching from reproduction to recording or from recording to reproduction.

In the dropout detection circuit of the invention described above, the first envelope detection means and the second envelope detection means preferably set the first time constant and the second time constant to be identical to each other for a predetermined time period from the time of switching.

In the dropout detection circuit of the invention described above, the dropout detection circuit preferably further includes variable gain means for changing the amplitude of the reflection signal of the light beam converged on the optical disc for irradiation of the optical disc to a predetermined amplitude at a predetermined gain, wherein each of the first and second envelope detection means detects an envelope of the reflection signal changed by the variable gain means.

In the dropout detection circuit of the invention described above, preferably, the first envelope detection means and the second envelope detection means set the first time constant and the second time constant to be identical to each other at the time of switching from reproduction to recording or from recording to reproduction, and the variable gain means uses different values of the predetermined gain between during recording and during reproduction.

In the dropout detection circuit of the invention described above, preferably, the first envelope detection means and the second envelope detection means set the first time constant and the second time constant to be identical to each other at the time of switching from reproduction to recording or from recording to reproduction, and the comparator means uses different values of the binary criterion between during recording and during reproduction.

In the dropout detection circuit of the invention described above, preferably, the first envelope detection means and the second envelope detection means set the first time constant and the second time constant identical to each other at the time of switching from reproduction to recording or from recording to reproduction, the variable gain means uses different values of the predetermined gain between during recording and during reproduction, and the comparator means uses different values of the binary criterion between during recording and during reproduction.

Alternatively, the dropout detection circuit of the present invention includes: variable gain means for changing the amplitude of a reflection signal of a light beam converged on an optical disc for irradiation of the optical disc to a predetermined amplitude at a predetermined gain different between during reproduction and during recording; first envelope detection means for detecting an envelope of the reflection signal having the predetermined amplitude with a first time constant; second envelope detection means for detecting an envelope of the reflection signal having the predetermined amplitude with a second time constant larger than the first time constant; differential means for generating a difference signal indicating a difference between the envelope output from the first envelope detection means and the envelope output from the second envelope detection means; and comparator means for converting the difference signal generated by the differential means to a binary value according to a predetermined binary criterion, wherein the first and second envelope detection means initialize the detected envelope values at the time of switching from reproduction to recording or from recording to reproduction.

According to the invention described above, even when the envelopes during recording and during reproduction fail to be completely in the same level due to variation in setting of the variable gain means and the like, detection of a false dropout is prevented and stable dropout detection is ensured because the envelope values are initialized at the time of switching from reproduction to recording or from recording to reproduction.

In the dropout detection circuit of the invention described above, the initialization by the first and second envelope detection means is preferably started simultaneously.

In the dropout detection circuit of the invention described above, the time required for the initialization by the second envelope detection means is preferably shorter than the time required for the initialization by the first envelope detection means.

Alternatively, the dropout detection circuit of the present invention includes: a low-pass filter for changing a frequency bandwidth of a reflection signal of a light beam converged on an optical disc for irradiation of the optical disc with a predetermined blocking frequency different between during reproduction and during recording; variable gain means for changing the amplitude of the reflection signal having the frequency bandwidth determined by the low-pass filter to a predetermined amplitude at a predetermined gain different between during reproduction and during recording; first pulse generation means for generating a first pulse signal for a first time period at the time of switching from reproduction to recording or from recording to reproduction; second pulse generation means for generating a second pulse signal for a second time period at the time of switching; first envelope detection means for detecting an envelope of the reflection signal having the predetermined amplitude with a first time constant; second envelope detection means for detecting an envelope of the reflection signal having the predetermined amplitude with a second time constant larger than the first time constant; differential means for generating a difference signal indicating a difference between the envelope output from the first envelope detection means and the envelope output from the second envelope detection means; comparator means for converting the difference signal generated by the differential means to a binary value according to a predetermined binary criterion; and a gate circuit for blocking an output from the comparator means, wherein the first and second envelope detection means forcefully discharge the respectively detected envelope values for the first time period in response to the first pulse signal, and the gate circuit blocks the output from the comparator means for the second time period in response to the second pulse signal.

According to the invention described above, detection of a false dropout at the time of switching from recording to reproduction or from reproduction to recording is prevented and stable dropout detection is ensured, without influence of a modulation signal during recording.

In the dropout detection circuit of the invention described above, the second time period is preferably longer than the first time period.

The optical disc apparatus of the present invention includes any of the dropout detection circuits described above.

BRIEF DESCRIPTION OF THE DRAWINGS

FIGS. 11A to 11C are illustrations of the operation of the dropout detection circuit of FIG. 10.

DESCRIPTION OF THE PREFERRED EMBODIMENTS

Figure 1:
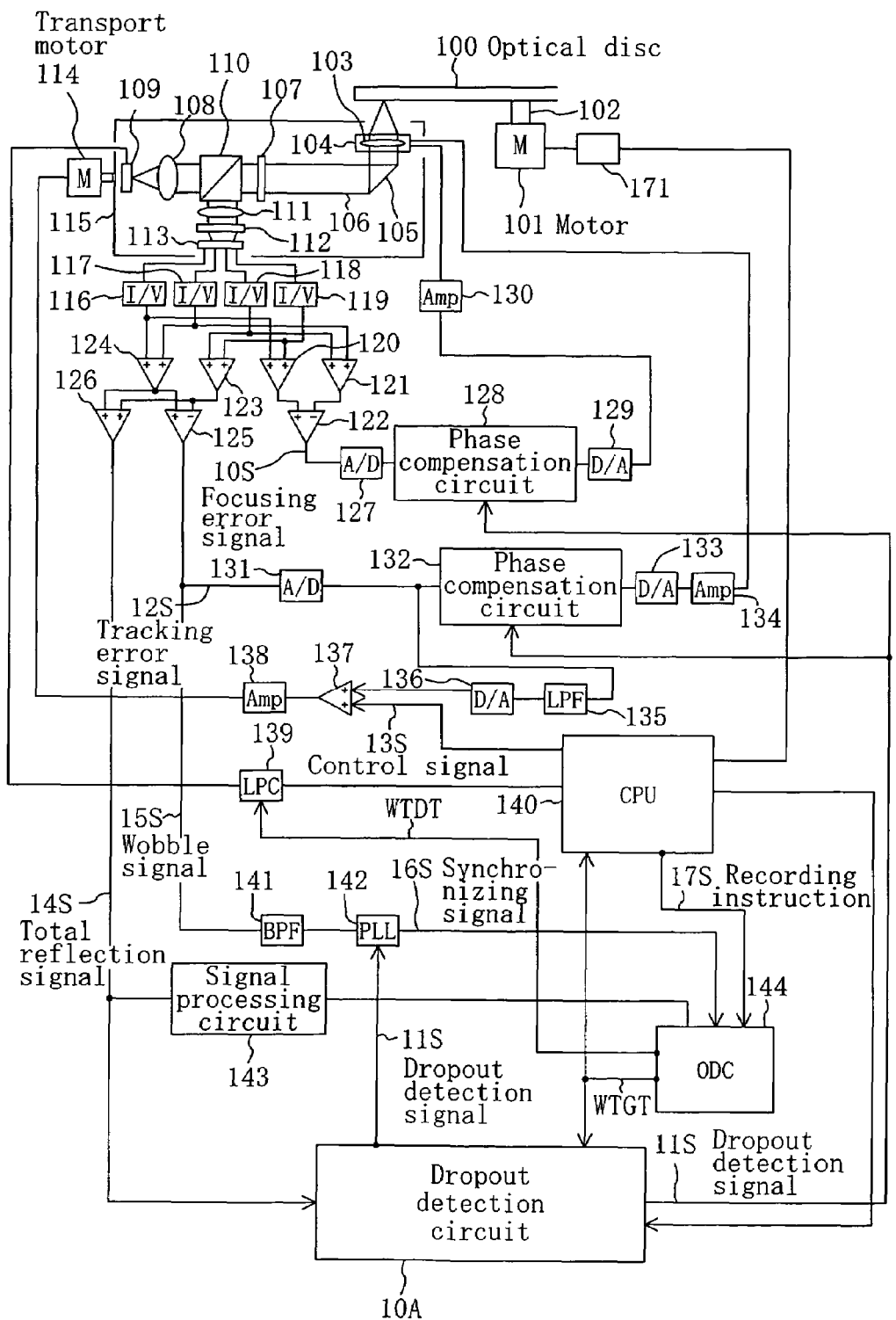
FIG. 1 is a block diagram of an optical disc apparatus of Embodiment 1 of the present invention.

Hereinafter, preferred embodiments of the present invention will be described with reference to the accompanying drawings. Note that common components throughout the drawings are denoted by the same reference numerals, and the description thereof is not repeated.

Embodiment 1

FIG. 1 illustrates an exemplary configuration of an optical disc apparatus of Embodiment 1 of the invention.

An optical disc 100 is mounted on a rotational axis 102 of a motor 101 and is rotated at a predetermined rotational speed. The optical disc 100 has spiral tracks formed by concave and convex portions when it is a disc for recording, and has information recorded in the form of pits when it is a reproduction-only disc. A transport station 115 holds a laser 109, a coupling lens 108, a polarizing beam splitter 110, a quarter-wave plate 107, a total reflection mirror 105, a photodetector 113 and an actuator 104, and is movable in the directions of the radium of the optical disc 100 with a transport motor 114.

A laser power control (LPC) circuit 139 operates under instruction from a central processing circuit (CPU) 140, to allow the laser 109 to emit light having a predetermined power. A light beam 106 emitted by the laser 109 mounted on the transport station 115 is collimated by the coupling lens 108. The collimated light passes through the polarizing beam splitter 110 and the quarter-wave plate 107, is reflected by the total reflection mirror 105, and is converged on the information surface of the optical disc 100 by a converging lens 103 to irradiate the converged spot.

Light reflected from the information surface of the optical disc 100 passes through the converging lens 103, is reflected by the total reflection mirror 105 and passes through the quarter-wave plate 107, the polarizing beam splitter 110, a detection lens 111 and a cylindrical lens 112, to be incident on the photodetector 113 composed of four light receiving parts. The converging lens 103 is attached to the movable part of the actuator 104. The actuator 104 includes a coil for focusing, a coil for tracking, a permanent magnet for focusing and a permanent magnet for tracking.

By application of a voltage to the coil for focusing (not shown) of the actuator 104 via a power amplifier 130, a current flows through the coil for focusing. With a magnetic force from the permanent magnet for focusing (not shown) on the coil for focusing, the converging lens 103 is allowed to move in the directions vertical to the plane of the optical disc 100 (upward/downward directions as is viewed from FIG. 1). The converging lens 103 is controlled so that the focal point of the light beam 106 is invariably positioned on the information surface of the optical disc 100 according to a focusing error signal 10S indicating a deviation of the focal point of the light beam from the information surface of the optical disc. Likewise, by application of a voltage to the coil for tracking (not shown) via a power amplifier 134, a current flows through the coil for tracking (not shown). With a magnetic force from the permanent magnet for tracking (not shown) on the coil for tracking, the converging lens 103 is allowed to move in the directions of the radius of the optical disc 100, that is, in the directions crossing the tracks of the optical disc 100 (rightward/leftward as is viewed from FIG. 1).

The photodetector 113 is composed of four light receiving parts. The reflected light from the optical disc 100 is incident on the four parts of the photodetector 113 and converted to currents by the respective parts. The resultant currents are sent to I/V converters 116, 117, 118 and 119, which convert the input currents to voltages corresponding to the levels of the currents.

Adders 120, 121, 123, 124 and 126 add input signals together and output the results, and subtracters 122 and 125 (also called "differential circuits") subtract one input signal from another and output the results.

<Focusing Control>

The output of the subtracter 122 is the focusing error signal 10S indicating a deviation of the focal point of the light beam irradiating the optical disc 100 from the information surface of the optical disc 100. The focusing error signal 10S is sent to an analog/digital (A/D) converter 127, a phase compensation circuit 128, a digital/analog (D/A) converter 129 and the power amplifier 130. By means of the power amplifier 130, a current flows through the coil for focusing of the actuator 104.

The A/D converter 127 converts the analog signal to a digital signal. The D/A converter 129 converts the digital signal to an analog signal.

The phase compensation circuit 128, which is a digital filter, performs phase compensation for the focusing control system to stabilize the control loop. The phase compensation circuit 128 can hold a control error signal generated based on the focusing error signal 10S in response to an external dropout detection signal 11S. In this way, the converging lens 103 is driven according to the focusing error signal 10S, and thus the focal point of the light beam is invariably positioned on the information surface.

<Tracking Control>

The output of the subtracter 125 is a tracking error signal 12S indicating a deviation of the spot of the light beam irradiating the optical disc 100 from a track of the optical disc 100. The tracking error signal 12S is sent to an A/D converter 131, a phase compensation circuit 132, a D/A converter 133 and the power amplifier 134. By means of the power amplifier 134, a current flows through the coil for tracking of the actuator 104.

The phase compensation circuit 132, which is a digital filter, performs phase compensation for the tracking control system to stabilize the control loop. The phase compensation circuit 132 can hold a control error signal generated based on the tracking error signal 12S in response to the external dropout detection signal 11S. In this way, the converging lens 103 is driven according to the tracking error signal 12S, and thus the focal point of the light beam invariably traces a track of the optical disc 100.

The tracking error signal 12S is also sent to a power amplifier 138 via a low-pass filter (LPF) 135, a D/A converter 136 and an adder 137. This enables the transport motor 114 to be controlled according to a low-frequency component of the tracking error signal 12S. In other words, in the tracking control system, the actuator 104 is used for tracing in response to a high-frequency component of the signal and the transport motor 114 is used for tracing in response to a low-frequency component of the signal. The adder 137 also receives a control signal 13S from the CPU 140, for moving the transport station 115 in the directions of the radius of the optical disc 100 under an instruction from the CPU 140.

The adder 126 adds the outputs of the adders 123 and 124 together. That is, the output of the adder 126 indicates the total light amount received by the photodetector 113, which is hereinafter called a total reflection signal 14S. The total reflection signal 14S from the adder 126 is sent to a signal processing circuit 143. The signal processing circuit 143, which performs processing for stable read of information recorded on the optical disc 100, sends the total reflection signal 14S to an optical disc controller (ODC) 144. The ODC 144 performs processing such as error correction based on the read information, and sends data to a computer and the like connected with the optical disc apparatus.

<Control of Recording>

The optical disc 100 has spiral tracks formed by concave and convex portions when the disc is for recording, and information is to be recorded along the tracks. During recording, an information signal to be recorded must be in synchronization with the rotational speed of the optical disc 100. To synchronize the information signal to be recorded with the rotational speed of the optical disc 100, the spiral tracks formed by concave and convex portions are somewhat modulated. This is called wobbling, and a wobble signal 15S is output from the subtracter 125, from which the tracking error signal 12S is also output.

The wobble signal 15S has an amplitude about one-tenth to one-twentieth of that of the tracking error signal 12S, and for this reason, a band-pass filter (BPF) 141 for wobbling is provided to extract the wobble signal 15S at a good S/N ratio. The BPF 141 permits passing of a wobble signal frequency (for example, 141 KHz for DVD-R discs), and the wobble signal extracted at a good S/N ratio is then subjected to phase comparison with a synchronizing signal for recording by a PLL circuit 142 for wobbling. The PLL circuit 142 for wobbling outputs a synchronizing signal 16S synchronized in phase with the wobble signal 15S to the ODC 144.

The PLL circuit 142 for wobbling also has a function of holding a preceding phase comparison control loop in response to the external dropout detection signal 11S.

The apparatus performs recording operation as follows. The CPU 140 sends a recording instruction 17S to the ODC 144 to instruct start of a recording sequence, and recording is started from an assigned target address. As the recording operation, the ODC 144 outputs a recording gate signal WTGT, and outputs recording data WTDT based on the synchronizing signal 16S input into the ODC 144. The recording gate signal WTGT switches the mode of the LPC circuit 139 to a recording mode via the CPU 140, and the LPC circuit 139 controls the recording power according to the recording data WTDT to enable recording of information on the optical disc 100.

<Dropout Detection in this Embodiment>

Figure 2:
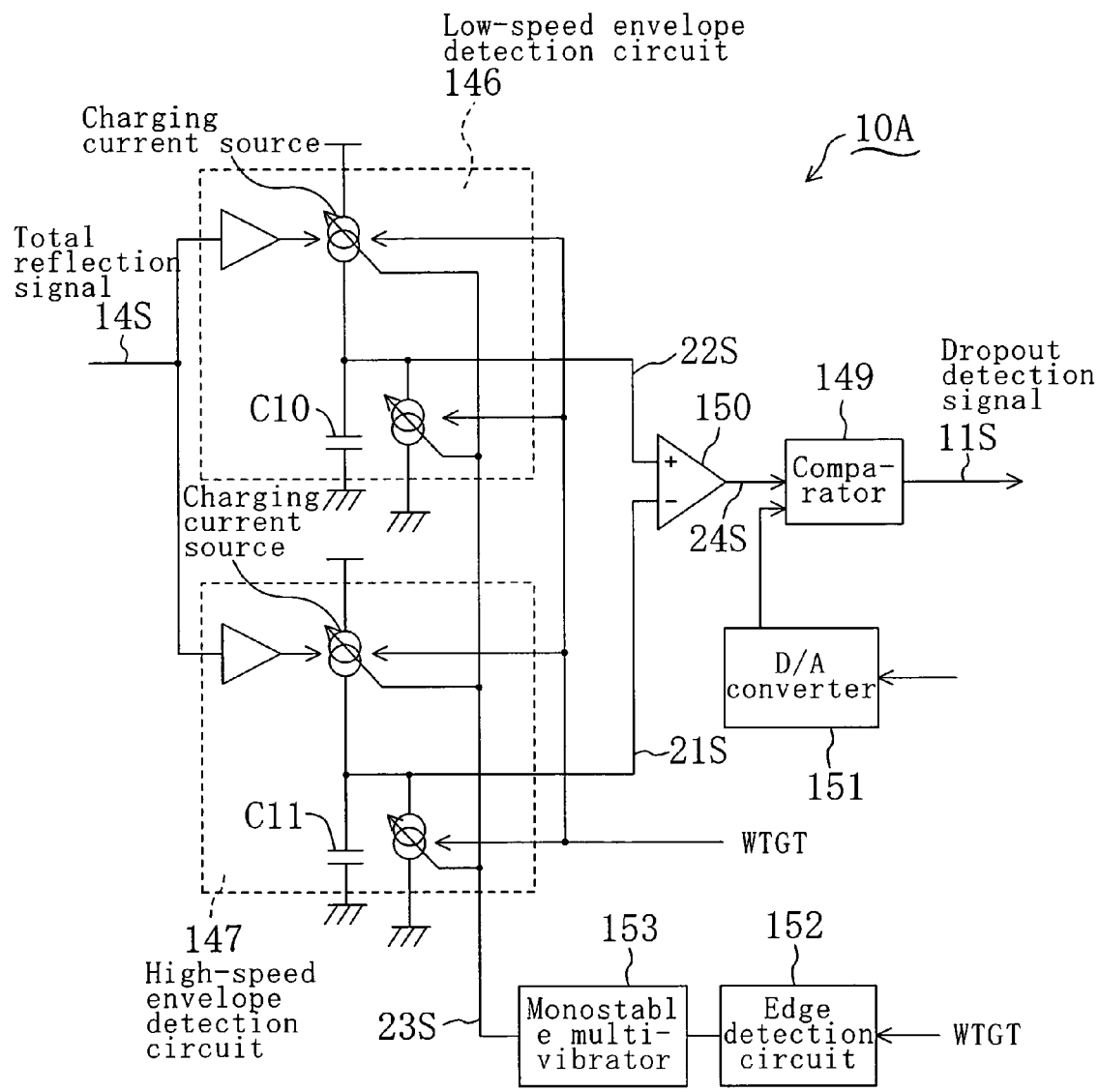
FIG. 2 is a block diagram of a dropout detection circuit shown in FIG. 1.

FIG. 2 illustrates an internal configuration of the dropout circuit 10A shown in FIG. 1. FIGS. 3A to 3I illustrate the operation of the dropout detection circuit 10A of FIG. 2.

The dropout detection circuit 10A of FIG. 2 includes: a low-speed envelope detection circuit 146 having a time constant (second time constant) larger than a time constant (first time constant) of a high-speed envelope detection circuit 147 to be described below; the high-speed envelope detection circuit 147 having the time constant (first time constant) smaller than the time constant (second time constant) of the low-speed envelope detection circuit 146; a differential circuit (differential means) 150; a comparator (comparator means) 149; a D/A converter 151 for determining the binary level for the comparator 149; an edge detection circuit 152 for detecting rising and falling edges of the recording gate signal WTGT; and a monostable multivibrator 153 for generating a pulse signal pulsing for a predetermined time period in synchronization with the rising and falling edges.

First, the total reflection signal 14S is input into the low-speed envelope detection circuit (second envelope detection means) 146 and the high-speed envelope detection circuit (first envelope detection means) 147. The low-speed and high-speed envelope detection circuits 146 and 147 are general detection circuits as shown in FIG. 2, each having a current source charging and a current source discharging according to the input signal. The current values of the charging and discharging current sources can be changed according to the recording gate signal WTGT. For example, assuming that the "H" level of the recording gate signal WTGT indicates the recording state and the "L" level indicates the reproduction state as shown in FIG. 3A, the current values of the current sources are set smaller when the recording gate signal WTGT is "H" than when it is "L".

The reason is as follows. As shown in FIG. 3B, during recording, the total reflection signal 14S output from the adder 126 is modulated from the maximum power (for example, 15 mw) to the minimum power (for example, 0.5 mw) of the recording according to the recording data WTDT. If dropout detection is performed in this case, a false dropout detection signal will be detected during recording. To avoid this problem, the current values of the current sources are decreased to thereby increase the detection time constant, and thus the total reflection signal is averaged as shown in FIG. 3D. Increase of the detection time constant may be realized by changing the capacitance values of capacitors C10 and C11 for charge/discharge while keeping constant the current values, in place of decreasing the current values.

Figure 3:
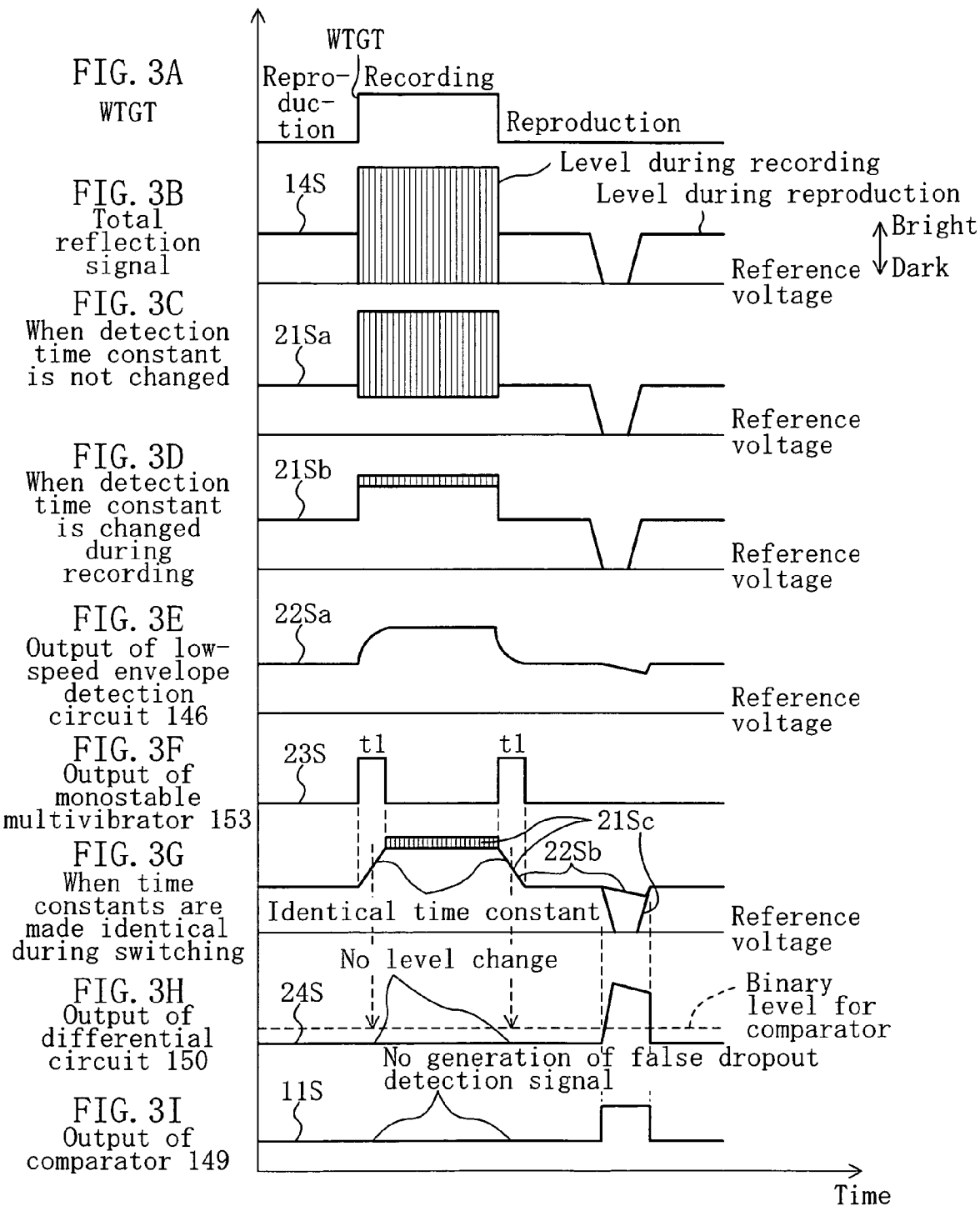
FIGS. 3A to 3I are illustrations of the operation of the dropout detection circuit of FIG. 2.

As described above, a high-speed envelope detection output 21Sb as shown in FIG. 3D is obtained by setting the time constant of the high-speed envelope detection circuit 147 to be larger during recording than during reproduction. In this case, therefore, if dropout detection is performed, the problem of detecting a false dropout detection signal 11S during recording is prevented.

However, as shown in FIG. 3B, a large level difference is generated between the level of the total reflection signal 14S during reproduction and the average level of the total reflection signal 14S during recording at the switching points from recording to reproduction and from reproduction to recording. If dropout detection is performed in this state, a false dropout detection signal 11S will be detected at these switching points. To avoid generation of a false dropout detection signal 11S, the current sources are controlled so that the detection time constants of the low-speed and high-speed envelope detection circuits 146 and 147 become identical to each other in synchronization with the switching points of the recording gate signal WTGT.

The edge detection circuit 152 detects the switching points of the recording gate signal WTGT by detecting edges of the recording gate signal WTGT. In synchronization with the detected edges, the monostable multivibrator 153 outputs a pulse signal 23S pulsing for a predetermined time period as shown in FIG. 3F for control of the current sources.

As a result, as shown in FIG. 3G, at the switching points from recording to reproduction and from reproduction to recording, the time constants becomes identical to each other, and thus the signal level of a signal 21Sc from the high-speed envelope detection circuit 147 and the signal level of a signal 22Sb from the low-speed envelope detection circuit 146 become identical to each other. The differential circuit 150 outputs a signal 24S indicating the difference between the signal 22Sb from the low-speed envelope detection circuit 146 and the signal 21Sc from the high-speed envelope detection circuit 147. As shown in FIG. 3H, a level change hardly occurs at and around the points at which the time constants are made identical to each other. Therefore, generation of a false dropout detection signal 11S is prevented at the switching points from recording to reproduction and from reproduction to recording.

In general, by generation of a dropout, the level of the total reflection signal 14S is lowered to the dark side. The signal 21Sa from the high-speed envelope detection circuit 147 substantially follows the envelope including a level reduction by a dropout as shown in FIG. 3C. On the contrary, the signal 22Sa from the low-speed envelope detection circuit 146, having a time constant larger than that of the high-speed envelope detection circuit 147, fails to follow the envelope including a level reduction due to a dropout, and thus hardly changes in level throughout the dropout period, as shown in FIG. 3E. Therefore, as in the conventional dropout detection, the differential circuit 150 calculates the difference between the signal 22Sb from the low-speed envelope detection circuit 146 and the signal 21Sc from the high-speed envelope detection circuit 147, and outputs the signal 24S of which the level largely changes at the dropout point during reproduction. Thus, the next-stage comparator 149 outputs the dropout detection signal 11S that becomes "H" during the dropout period as shown in FIG. 3I. The binary level used by the comparator 149 as the detection level for the dropout detection signal 11S, with respect to the total reflection light amount, may be freely determined by setting an arbitrary value in the D/A converter 151.

As described above, in the dropout detection circuit 10A of this embodiment, the value of the detection time constant used in the high-speed envelope detection circuit 147 is made larger in the recording state than in the reproduction state. By this setting, dropout detection is possible without influence of a modulation signal during recording. In addition, at the switching points from recording to reproduction and from reproduction to recording, the values of the detection time constants of the low-speed envelope detection circuit 146 and the high-speed envelope detection circuit 147 are made identical to each other. By this setting, stable dropout detection with high reliability is possible without detection of a false dropout detection signal 11S at the switching points from recording to reproduction and from reproduction to recording.

Embodiment 2

Figure 4:
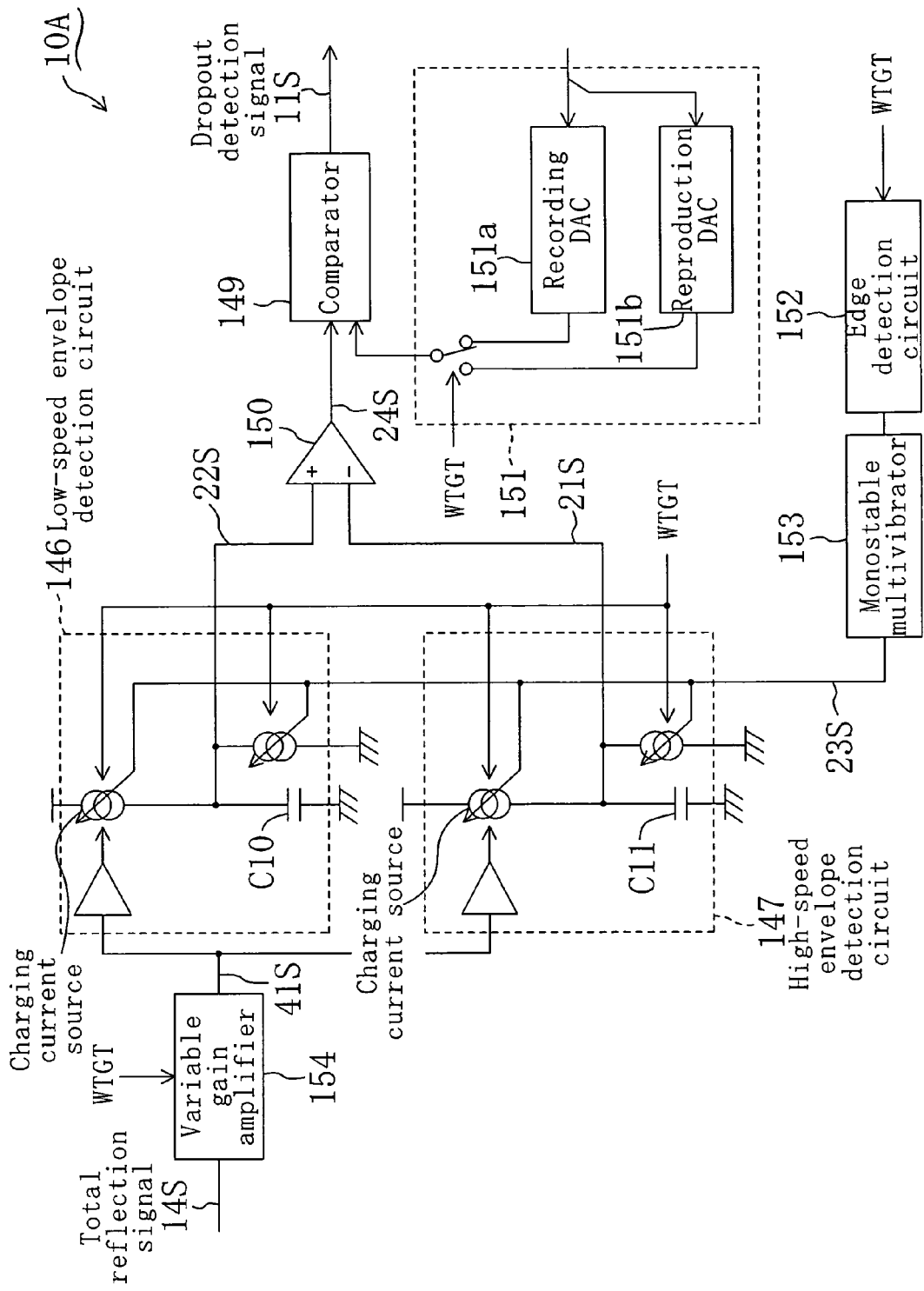
FIG. 4 is a block diagram of a dropout detection circuit of an optical disc apparatus of Embodiment 2 of the present invention.

An optical disc apparatus of Embodiment 2 of the present invention includes a dropout detection circuit 10A shown in FIG. 4 in place of the dropout detection circuit 10A shown in FIG. 2. The other components of the optical disc apparatus of this embodiment are the same as those shown in FIG. 1. FIGS. 5A to 5G illustrate the operation of the dropout detection circuit 10A of FIG. 4.

The dropout detection circuit 10A of FIG. 4 includes a variable gain amplifier (variable gain means) 154 in addition to the configuration shown in FIG. 2.

Figure 5:
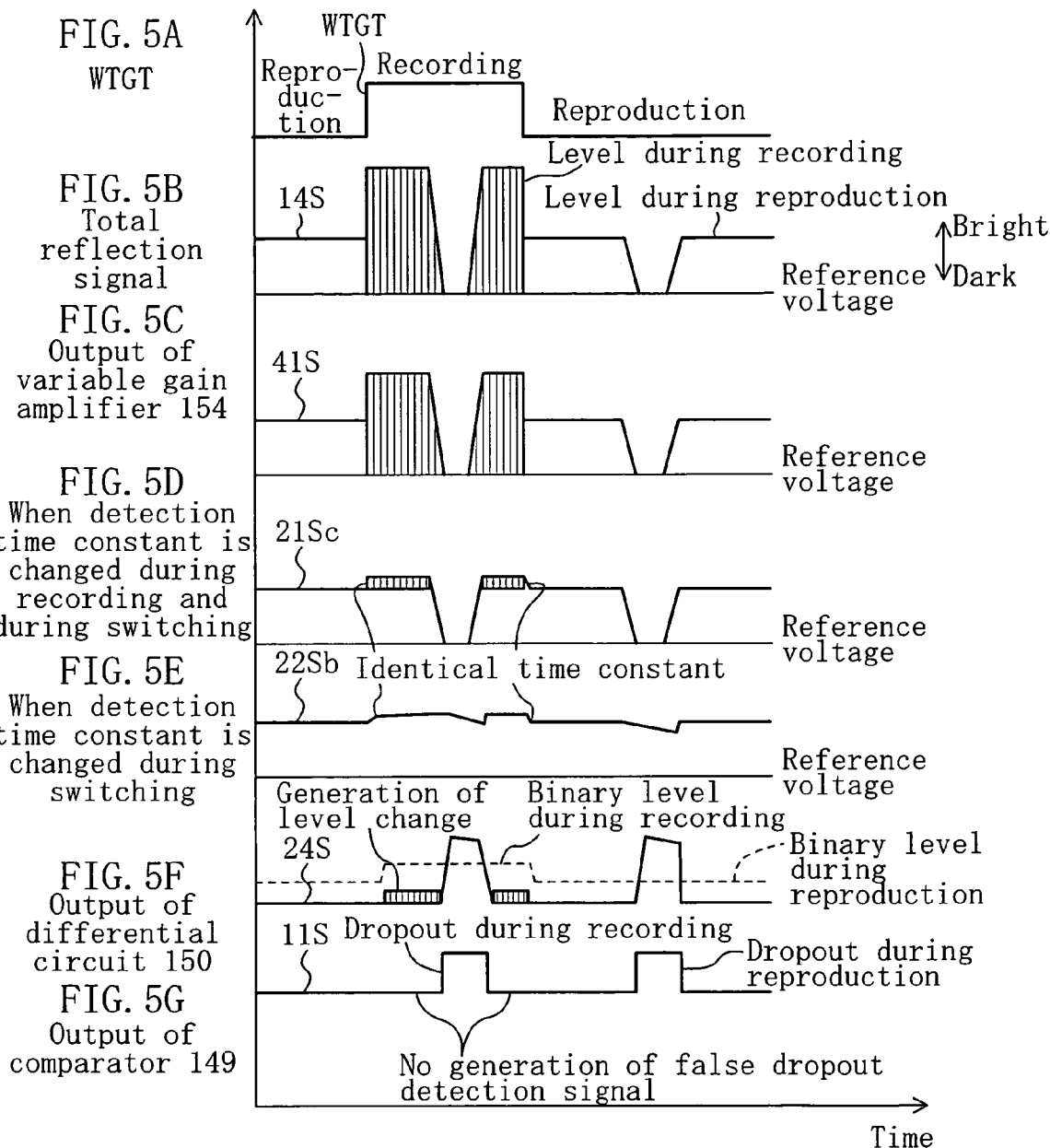
FIGS. 5A to 5G are illustrations of the operation of the dropout detection circuit of FIG. 4.

The total reflection signal 14S from the adder 126 is input into the variable gain amplifier 154. The variable gain amplifier 154 changes a gain according to the recording gate signal WTGT. The reason for changing the gain is as follows. As described in Embodiment 1, during recording, the total reflection signal 14S is modulated from the maximum power (for example, 15 mw) to the minimum power (for example, 0.5 mw) of the recording according to the recording data WTDT as shown in FIG. 5B. This causes a large level difference between the level of the total reflection signal 14S during reproduction and the average level of the total reflection signal 14S during recording. The variable gain amplifier 154 is provided to make these levels roughly identical to each other and thereby prevent generation of a false dropout detection signal 11S.

As shown in FIG. 5C, the variable gain amplifier 154, which has received the total reflection signal 14S, outputs a signal 41S in which the levels during recording and during reproduction are made roughly close to each other. The signal 41S from the variable gain amplifier 154 is input into the low-speed envelope detection circuit 146 and the high-speed envelope detection circuit 147, and the detection time constant is changed according to the recording gate signal WTGT as in Embodiment 1. Also as in Embodiment 1, the detection time constants are made identical to each other at the switching points from recording to reproduction and from reproduction to recording. A signal 21Sc from the high-speed envelope detection circuit 147 shown in FIG. 5D is obtained by increasing the time constant during recording and making the time constant identical to that of the low-speed envelope detection circuit 146 in synchronization with the switching from reproduction to recording or from recording to reproduction. A signal 22Sb from the low-speed envelope detection circuit 146 shown in FIG. 5E is obtained by making the time constant identical to that of the high-speed envelope detection circuit 147 in synchronization with the switching from reproduction to recording or from recording to reproduction. If dropout detection is performed during this period at which the time constants are made identical to each other, detection of a false dropout detection signal 11S is prevented as in Embodiment 1.

However, the signal 24S from the differential circuit 150 may have a level change as shown in FIG. 5F depending on the detection time constant of the high-speed envelope detection circuit 147 because the envelope during recording is influenced by the frequency distribution of the recording data WTDT. This level change may exceed the binary level used by the comparator 149 during reproduction for detection as the dropout detection signal 11S. In such a case, a false dropout detection signal 11S will be generated during recording. To prevent generation of a false dropout detection signal 11S, the D/A converter 151 for determining the binary level for the comparator 149 is provided with a recording DAC 151a and a reproduction DAC 151b as shown in FIG. 4. With this configuration, the binary level for the comparator 149 can be switched between the level during recording and that during reproduction as shown in FIG. 5F. This prevents generation of a false dropout detection signal 11S during recording and thus enables stable detection of the true dropout detection signal 11S, as shown in FIG. 5G.

As described above, in the dropout detection circuit 10A of this embodiment, the average level of the total reflection signal 14S during recording and the level of the total reflection signal 14S during reproduction are made roughly identical to each other by the variable gain amplifier 154. In addition, the detection time constants of the low-speed envelope detection circuit 146 and the high-speed envelope detection circuit 147 during recording are changed from those during reproduction. By this setting, the dropout detection signal 11S can be detected without influence of a modulation signal during recording. Moreover, to enable independent dropout detection settings during recording and during reproduction, the binary level is switched between the level during recording and that during reproduction. This makes it possible to set a detection level according to the state of recording or reproduction and thus prevent detection of a false dropout detection signal 11S. Furthermore, the detection time constants of the low-speed envelope detection circuit 146 and the high-speed envelope detection circuit 147 are made identical to each other at the switching points from recording to reproduction and from reproduction to recording. By this setting, stable dropout detection with high reliability is possible without detection of a false dropout detection signal 11S even at these switching points.

Embodiment 3

Figure 6:
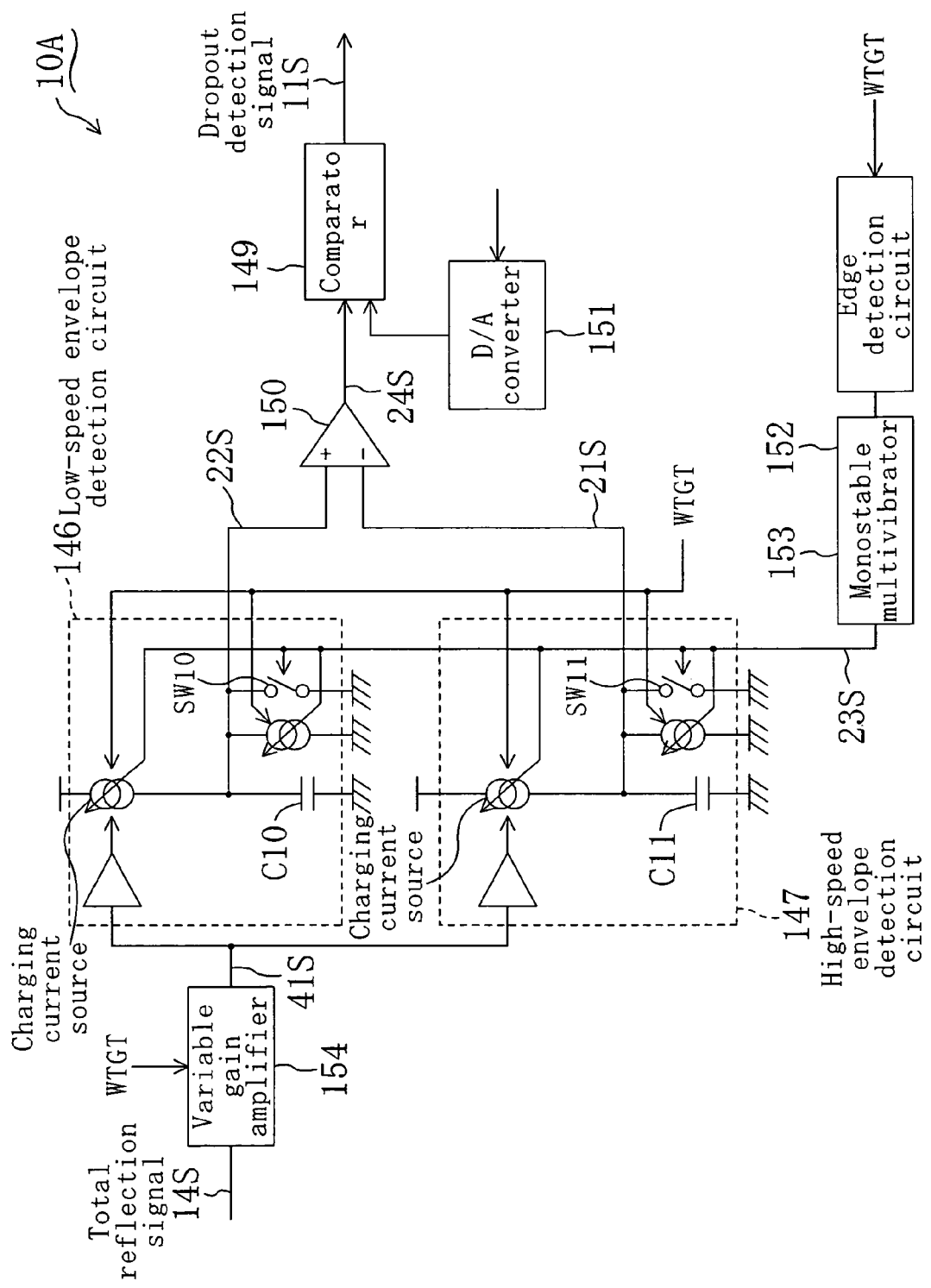
FIG. 6 is a block diagram of a dropout detection circuit of an optical disc apparatus of Embodiment 3 of the present invention.

An optical disc apparatus of Embodiment 3 of the present invention includes a dropout detection circuit 10A shown in FIG. 6 in place of the dropout detection circuit 10A shown in FIG. 2. The other components of the optical disc apparatus of this embodiment are the same as those shown in FIG. 1. FIGS. 7A to 7I illustrate the operation of the dropout detection circuit 10A of FIG. 6.

Referring to FIG. 6, the total reflection signal 14S is input into the variable gain amplifier 154. The variable gain amplifier 154 changes a gain according to the recording gate signal WTGT. By this gain change, the average level of the total reflection signal 14S during recording and the level of the total reflection signal 14S during reproduction are made roughly identical to each other. Therefore, the signal 41S output from the variable gain amplifier 154 is a total reflection signal in which the levels during recording and during reproduction are roughly the same. The signal 41S is input into the low-speed envelope detection circuit 146 and the high-speed envelope detection circuit 147.

Figure 7:
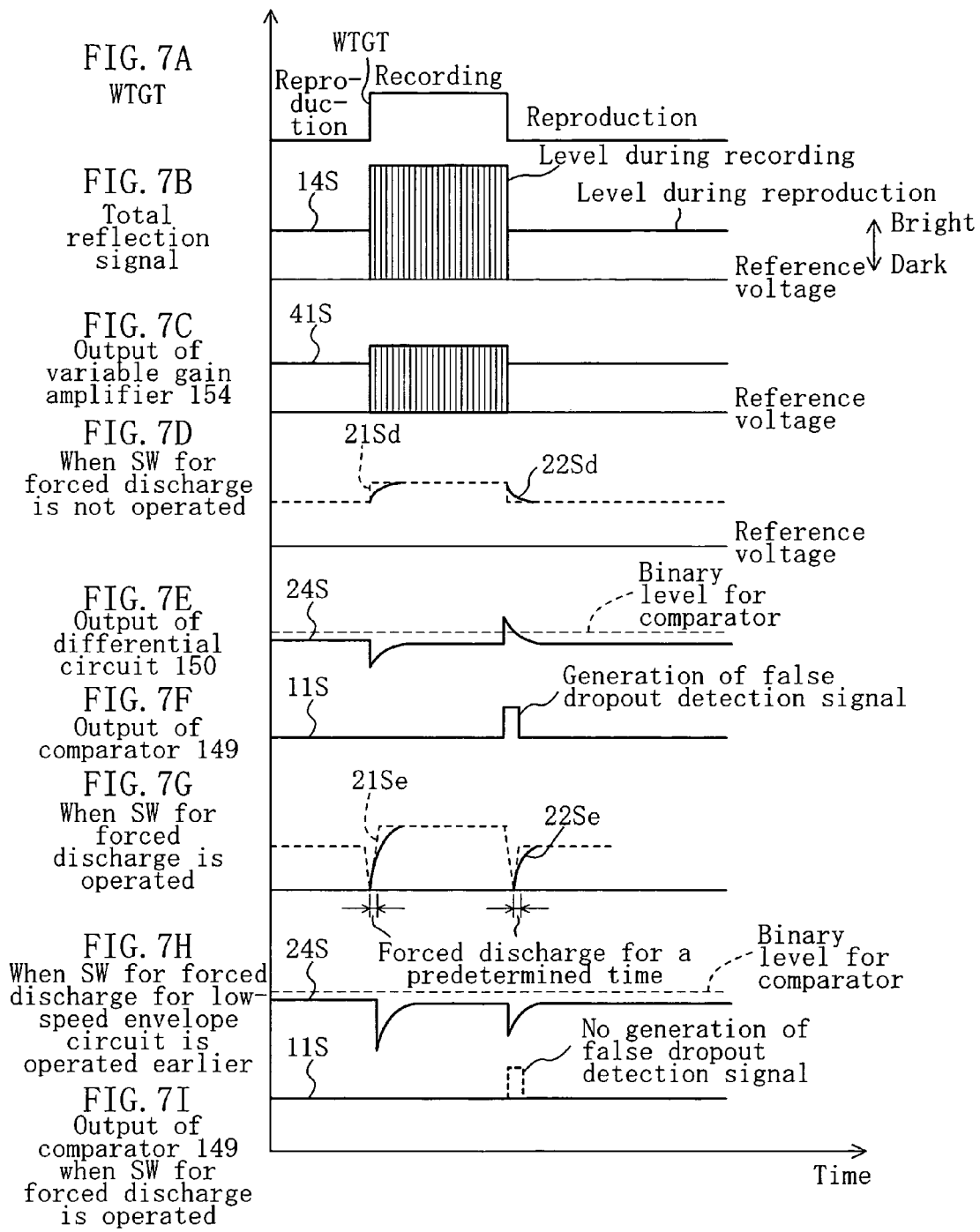
FIGS. 7A to 7I are illustrations of the operation of the dropout detection circuit of FIG. 6.

Due to variation in setting of the variable gain amplifier 154 and the like, however, the levels of the signal 41S output from the variable gain amplifier 154 during recording and during reproduction are not completely the same. Therefore, there may possibly arise a case that the output level from the low-speed envelope detection circuit 146 and the output level from the high-speed envelop detection circuit 147 are reversed during recording and during reproduction. As shown in FIG. 7D, for example, if only a small level difference occurs, the output level of a signal 22Sd from the low-speed envelope detection circuit 146 and the output level of a signal 21Sd from the high-speed envelope detection circuit 147 are reversed. In this case, the differential circuit 150 outputs the signal 24S having a waveform as shown in FIG. 7E, and as a result, the comparator 149 may output a false dropout detection signal 11S as shown in FIG. 7F.

To prevent generation of a false dropout detection signal 11S as described above, the low-speed envelope detection circuit 146 and the high-speed envelope detection circuit 147 are provided with switches SW10 and SW11 for forced discharge, respectively, as shown in FIG. 6. With the switches SW10 and SW11, charges stored in the capacitors C10 and C11 for charge/discharge are forcefully discharged for predetermined time periods shown in FIG. 7G at the switching points from recording to reproduction and from reproduction to recording. The predetermined time period during which the switches SW10 and SW11 for forced discharge are operated is determined by the pulse signal generated by the monostable multivibrator 153 in synchronization with the edges of the recording gate signal WTGT.

If no forced discharge with the switches SW10 and SW11 is performed, a false dropout detection signal 11S will be generated at the time point when the total reflection signal 14S shifts from the high level to the low level as shown in FIG. 7F. By performing forced discharge with the switches SW10 and SW11, a signal 22Se from the low-speed envelope detection circuit 146 and a signal 21Se from the high-speed envelope detection circuit 147 form a waveform as shown in FIG. 7G, and therefore, the signal 24S from the differential circuit 150 has a waveform as shown in FIG. 7H. As a result, as shown in FIG. 7I, generation of a false dropout detection signal 11S as the output of the comparator 149 is prevented even at the switching points of the total reflection signal 14S from recording to reproduction and from reproduction to recording.

In the case described above, just simply operating the switches SW10 and SW11 will cause a problem. For example, if a time lag arises between the operations of the switches SW10 and SW11 for forced discharge of the low-speed envelope detection circuit 146 and the high-speed envelope detection circuit 147, this may cause generation of a false dropout detection signal 11S. To avoid this, the operations of the switches SW10 and SW11 must be started simultaneously. In addition, in consideration of the fact that dropout detection is realized by use of the difference in envelope between the low-speed and high-speed sides, the forced discharge must be started earlier in the low-speed envelope detection circuit 146 than in the high-speed envelope detection circuit 147.

Although this embodiment was implemented with the analog circuits, it may also be implemented with digital processing circuits. For example, the operation of the forced discharge may be performed by decrementing an A/D converted digital value every predetermined clock, and the forced discharge with a switch may be realized by resetting the digital value to an initial value.

In this embodiment, the switches SW10 and SW11 were placed inside the low-speed envelope detection circuit 146 and the high-speed envelope detection circuit 147. Alternatively, the same effect of this embodiment is also obtained by placing the switches SW10 and SW11 outside the low-speed envelope detection circuit 146 and the high-speed envelope detection circuit 147.

As described above, in the dropout detection circuit 10A of this embodiment, the average level of the total reflection signal 14S during recording and the level of the total reflection signal 14S during reproduction are made roughly identical to each other by the variable gain amplifier 154. By this setting, dropout detection can be performed without influence of a modulation signal during recording. Also, charges stored in the capacitors for charge/discharge of the low-speed envelope detection circuit 146 and the high-speed envelope detection circuit 147 are forcefully discharged at the switching points from recording to reproduction and from reproduction to recording. By this forced discharge, stable dropout detection with high reliability is possible without detection of a false dropout detection signal 11S even at the switching points from recording to reproduction and from reproduction to recording.

Embodiment 4

Figure 8:
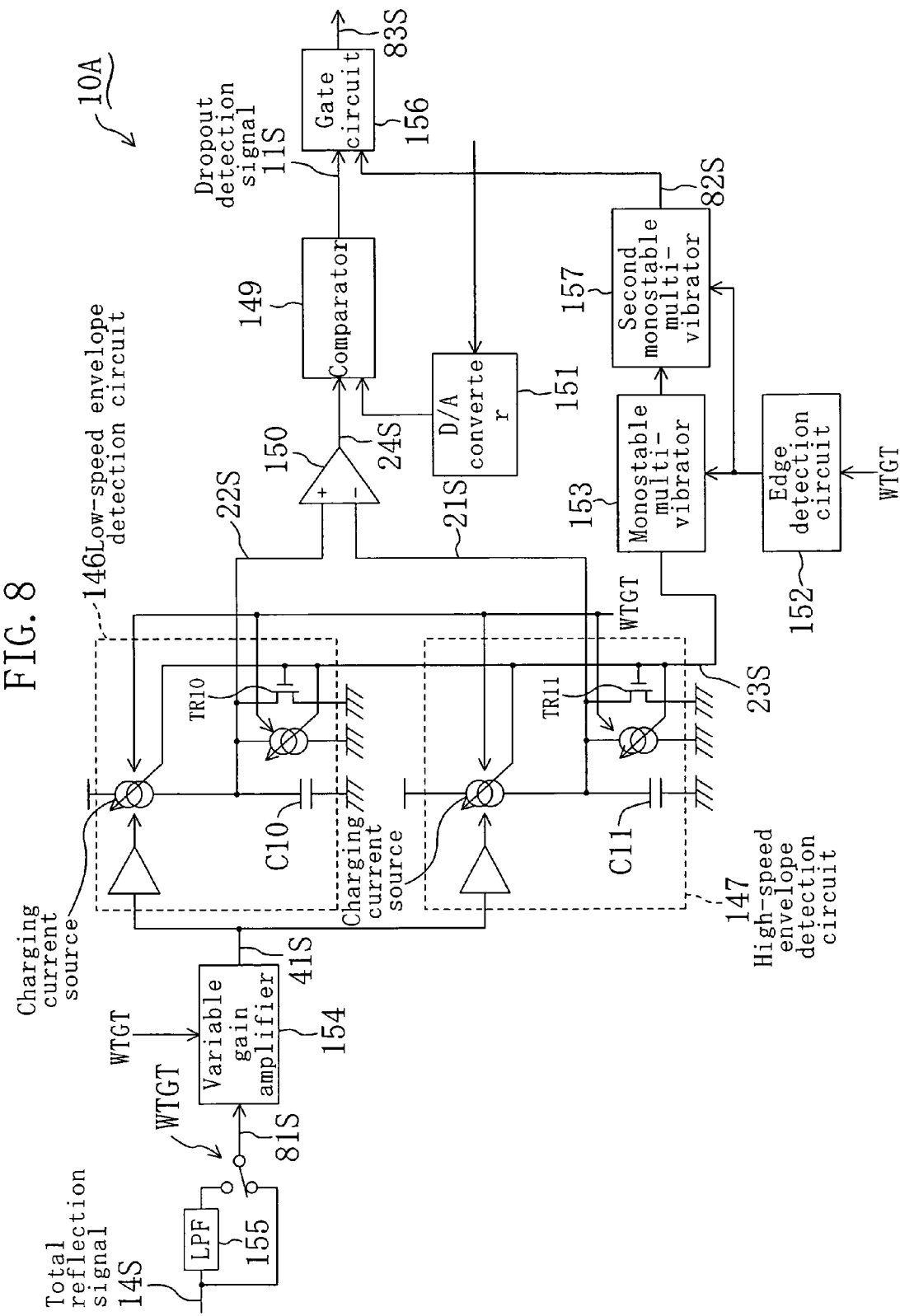
FIG. 8 is a block diagram of a dropout detection circuit of an optical disc apparatus of Embodiment 4 of the present invention.

An optical disc apparatus of Embodiment 4 of the present invention includes a dropout detection circuit 10A shown in FIG. 8 in place of the dropout detection circuit 10A shown in FIG. 2. The other components of the optical disc apparatus of this embodiment are the same as those shown in FIG. 1. FIGS. 9A to 9J illustrate the operation of the dropout detection circuit 10A of FIG. 8.

Figure 9:
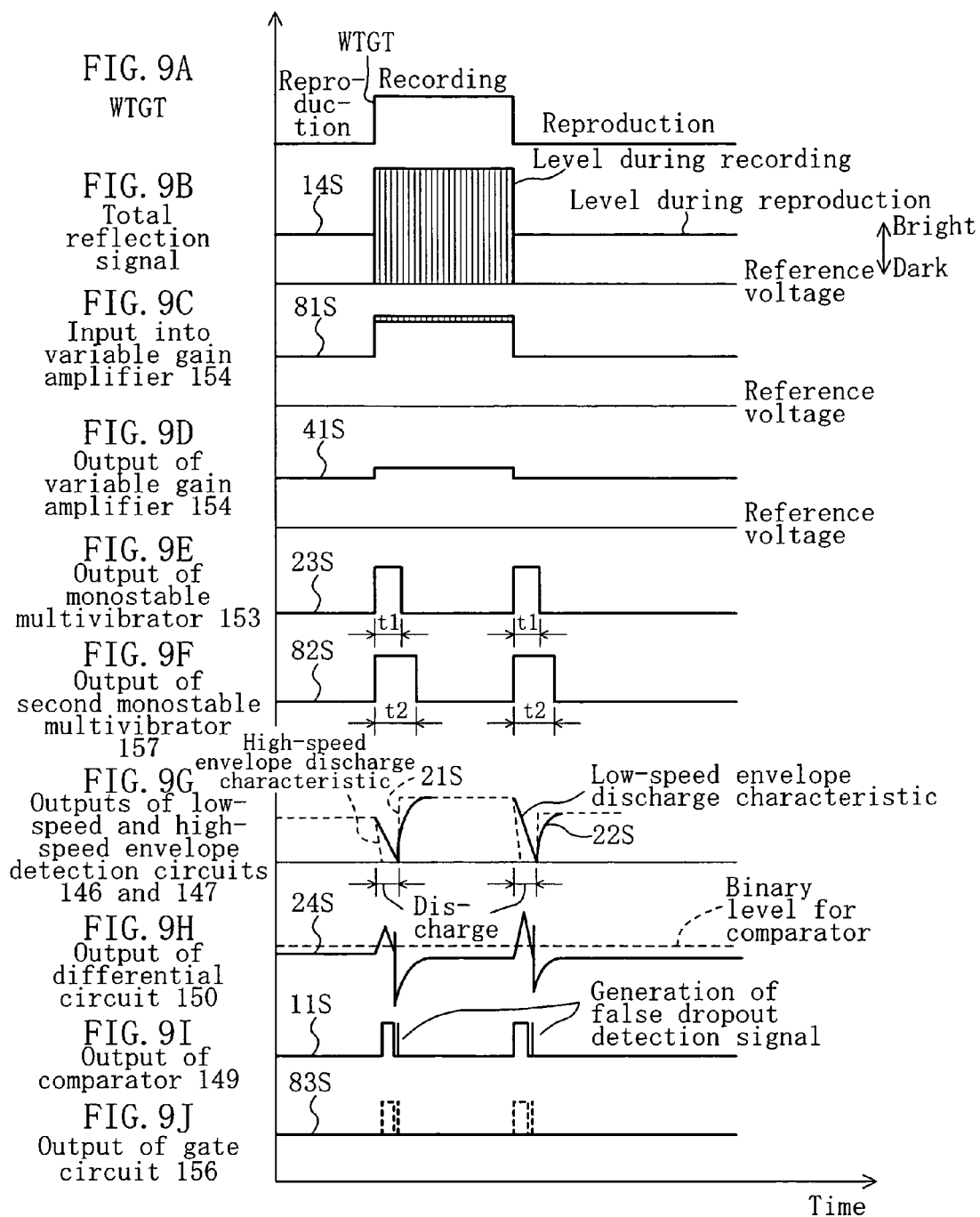
FIGS. 9A to 9J are illustrations of the operation of the dropout detection circuit of FIG. 8.
Figure 10:
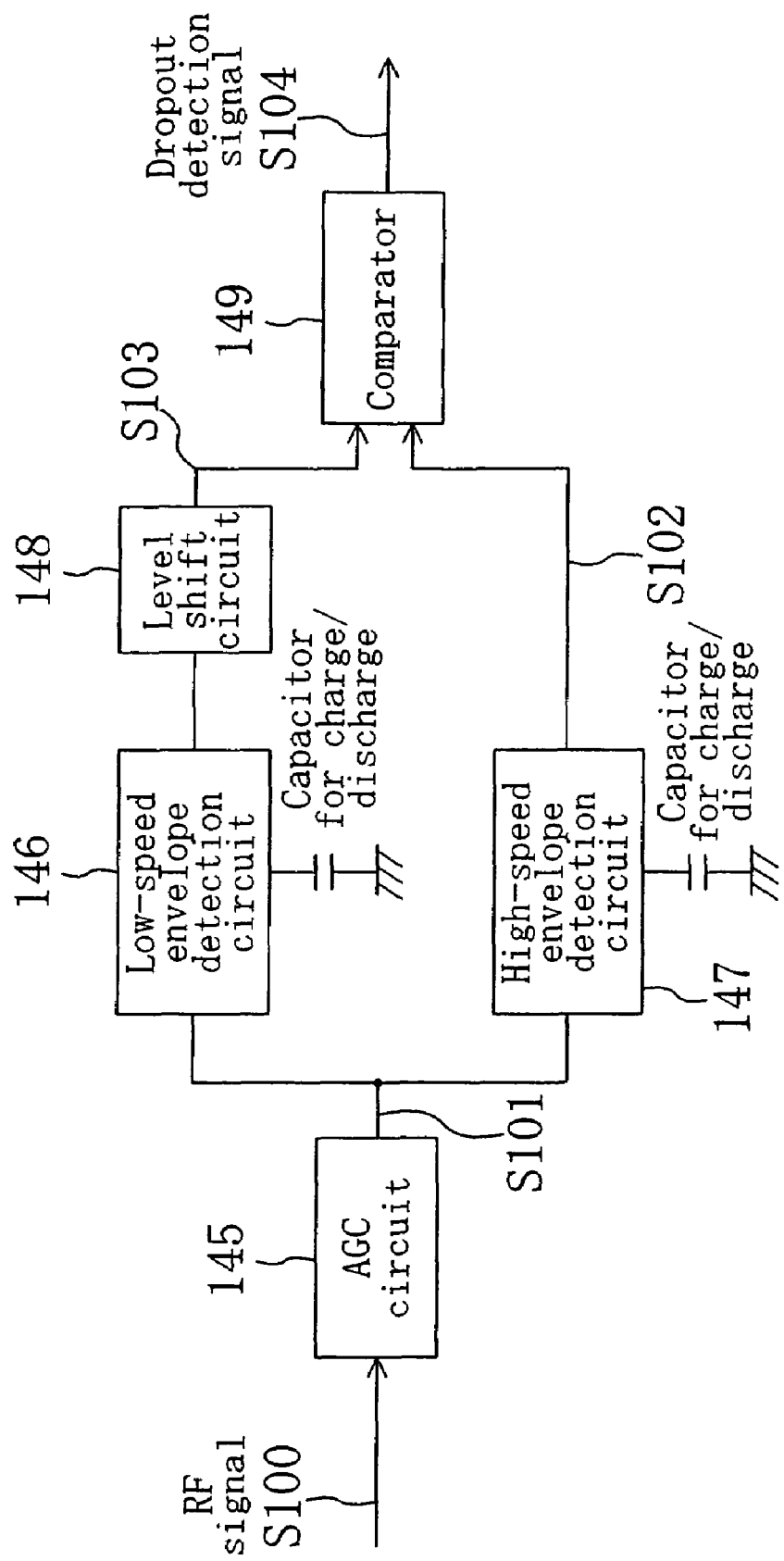
FIG. 10 is a block diagram of a conventional dropout detection circuit.

As shown in FIG. 8, there is provided a circuit for switching the path of the total reflection signal 14S according to the recording gate signal WTGT, at a stage preceding the variable gain amplifier 154 shown in FIG. 6. This circuit allows the total reflection signal 14S to pass through a low-pass filter (LPF) 155 during recording and to be directly input into the variable gain amplifier 154 during reproduction. The total reflection signal 14S is guided to pass through the LPF 155 during recording because the level of the total reflection signal 14S is subjected to recording modulation with the recording data WTDT as shown in FIG. 9B. By the passing through the LPF 155 during recording, the level of a signal 81S input into the variable gain amplifier 154 is averaged as shown in FIG. 9C. As the bandwidth for the LPF 155, there is set a frequency with which the total reflection signal 14S subjected to recording modulation with the recording data WTDT can be averaged adequately and yet good response can be exhibited in dropout detection. In this embodiment, a frequency of about 100 KHz is presumed. As another method for averaging the total reflection signal 14S adequately during recording, the pass band of the LPF 155 may be switched between ones used during recording and during reproduction.

The signal 81S that has passed through the LPF 155 during recording is input into the variable gain amplifier 154. In the variable gain amplifier 154, the gain is changed according to the recording gate signal WTGT, so that the average level of the total reflection signal 14S during recording and the level of the total reflection signal 14S during reproduction are made roughly identical to each other as shown in FIG. 9D. The signal 41S output from the variable gain amplifier 154 is input into the low-speed envelope detection circuit 146 and the high-speed envelope detection circuit 147.

As in Embodiment 3 described above, the average level of the total reflection signal 14S during recording and the level of the total reflection signal 14S during reproduction are not completely identical to each other due to variation in setting of the variable gain amplifier 154 and the like. For this reason, just a small level difference may lead to generation of a false dropout detection signal 11S. To prevent detection of a false dropout detection signal 11S, forced discharge is performed for predetermined time periods at the switching points from recording to reproduction and from reproduction to recording. In this embodiment, as shown in FIG. 8, transistors TR10 and TR11 are provided to allow forced discharge of charges stored in the capacitors C10 and C11 for charge/discharge.

The detection time constants of the low-speed envelope detection circuit 146 and the high-speed envelope detection circuit 147 are determined depending on the capacitance values of the capacitors C10 and C11 for charge/discharge and the values of the discharge currents. In general, to secure a difference in time constant, the detection time constants are often determined depending on the capacitance values of the capacitors C10 and C11 for charge/discharge, while the same discharge current value is set for the low-speed envelope detection circuit 146 and the high-speed envelope detection circuit 147. Therefore, a large capacitance value is set for the capacitor C10 of the low-speed side while a small capacitance value is set for the capacitor C11 of the high-speed side.

In the forced discharge with the transistors TR10 and TR11, the forced discharge characteristic differs between the low-speed and high-speed envelope detection circuits as shown in FIG. 9G due to the difference in capacitance value between the capacitors on the low-speed side and the high-speed side as described above. As a result, as shown in FIG. 9H, the signal 24S output from the differential circuit 150 has level changes in the direction inviting dropout detection. The forced discharge is performed in response to a pulse (first pulse signal) generated during time t1 (first time) determined by the monostable multivibrator (first pulse generation means) 153 in synchronization with the rising or falling edge of the recording gate signal WTGT, as shown in FIG. 9E. The time t1 is a time period required for the charges stored in the capacitor C10 of the low-speed envelope detection circuit 146 and the capacitor C11 of the high-speed envelope detection circuit 147 to be made identical to each other. Therefore, the time t1 is predominantly determined based on the forced discharge time constant of the low-speed envelope detection circuit in which the capacitor for charge/discharge has a capacitance value larger than that of the high-speed envelop detection circuit.

The forced discharge is performed for the predetermined time t1 determined by the monostable multivibrator 153. During the forced discharge, level changes arise in the direction inviting dropout detection as described above, and therefore a false dropout detection signal 11S may be generated as shown in FIG. 9I. To overcome this problem, a second monostable multivibrator (second pulse generation means) 157 is provided as shown in FIG. 8 for generating a pulse for a longer time period than the time t1 determined by the monostable multivibrator 153. The second monostable multivibrator 157 generates a pulse (second pulse signal) for time t2 (second time) as shown in FIG. 9F. In response to the pulse output from the second monostable multivibrator 157, a gate circuit 156 performs gate processing of the signal 11S output from the comparator 149. Specifically, the gate circuit 156 outputs an "L" level signal irrespective of the signal 11S from the comparator 149 as long as a signal 82S output from the second monostable multivibrator 157 is in the "H" level. In this way, by the forced discharge of the different capacitances in the low-speed and high-speed envelope detection circuits 146 and 147 and also by the gate processing described above, a signal 83S output from the gate circuit 156 is free from generation of a false dropout detection signal 11S that is output from the comparator 149, as shown in FIG. 9J.

The time t2 for the gate processing by the gate circuit 156 may be prepared by two stages by the monostable multivibrator 153 and the second monostable multivibrator 157.

In this embodiment, also, the operation of the forced discharge may be implemented with digital processing circuits. For example, the operation of the forced discharge may be performed by decrementing an A/D converted digital value every predetermined clock.

In this embodiment, the transistors TR10 and TR11 were placed inside the low-speed envelope detection circuit 146 and the high-speed envelope detection circuit 147.

Alternatively, the same effect of this embodiment is also obtained by placing the transistors TR10 and TR11 outside the low-speed envelope detection circuit 146 and the high-speed envelope detection circuit 147.

As described above, in the dropout detection circuit 10A of this embodiment, the total reflection signal 14S passes through the LPF 155 during recording, and the average level of the total reflection signal 14S during recording and the level of the total reflection signal 14S during reproduction are made roughly identical to each other. In addition, charges stored in the capacitors for charge/discharge of the low-speed envelope detection circuit 146 and the high-speed envelope detection circuit 147 are forcefully discharged at the switching points from recording to reproduction and from reproduction to recording, and generation of a false dropout detection signal 11S is blocked by the gate circuit 156. This enables prevention of detection of a false dropout detection signal 11S at the switching points from recording to reproduction and from reproduction to recording without influence of a modulation signal during recording. As a result, stable dropout detection with high reliability is possible irrespective of during recording or during reproduction While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A dropout detection circuit comprising:
a variable gain amplifier configured to change the amplitude of a reflection signal of a light beam converged on an optical disc for irradiation of the optical disc to a predetermined amplitude at a predetermined gain different between during reproduction and during recording;
a first envelope detector configured to detect an envelope of the reflection signal changed to have the predetermined amplitude with a first time constant;
a second envelope detector configured to detect an envelope of the reflection signal changed to have the predetermined amplitude with a second time constant larger than the first time constant; and
a comparator configured to obtain a binary value according to a predetermined binary criterion based on a difference between the envelope output from the first envelope detector and the envelope output from the second envelope detector,
wherein the first and second envelope detectors initialize the detected envelope values at the time of switching from reproduction to recording or from recording to reproduction.

2. The dropout detection circuit of claim 1, wherein the initializations by the first and second envelope detectors are started substantially at the same time.

3. The dropout detection circuit of claim 1, wherein the time required for the initialization by the second envelope detector is shorter than the time required for the initialization by the first envelope detector.

4. An optical disc apparatus comprising the dropout detection circuit of claim 1.

5. A dropout detection circuit comprising:
a low-pass filter configured to change a frequency bandwidth of a reflection signal of a light beam converged on an optical disc for irradiation of the optical disc with a predetermined blocking frequency different between during reproduction and during recording;
a variable gain amplifier configured to change the amplitude of the reflection signal having the frequency bandwidth determined by the low-pass filter to a predetermined amplitude at a predetermined gain different between during reproduction and during recording;
a first pulse generator configured to generate a first pulse signal for a first time period at the time of switching from reproduction to recording or from recording to reproduction;
a second pulse generator configured to generate a second pulse signal for a second time period at the time of switching;
a first envelope detector configured to detect an envelope of the reflection signal having the predetermined amplitude with a first time constant;
a second envelope detector configured to detect an envelope of the reflection signal having the predetermined amplitude with a second time constant larger than the first time constant;
a comparator configured to obtain a binary value according to a predetermined binary criterion based on a difference between the envelope output from the first envelope detector and the envelope output from the second envelope detector; and
a gate circuit operable to block an output from the comparator,
wherein the first and second envelope detectors forcefully discharge the respectively detected envelope values for the first time period in response to the first pulse signal, and
the gate circuit blocks the output from the comparator for the second time period in response to the second pulse signal.

6. The dropout detection circuit of claim 5, wherein the second time period is longer than the first time period.

7. An optical disc apparatus comprising the dropout detection circuit of claim 5.

* * * * *